United States Patent
Minakawa et al.

(10) Patent No.: US 9,745,214 B2
(45) Date of Patent: Aug. 29, 2017

(54) PORTABLE HYDROGEN-WATER GENERATING POT

(71) Applicant: Hiroaki Minakawa, Ibaraki (JP)

(72) Inventors: Hiroaki Minakawa, Hitachi (JP); Nobuaki Ono, Takahagi (JP)

(73) Assignee: Hiroaki Minakawa, Hitachi-shi Ibaraki (JP)

( * ) Notice: Subject to any disclaimer, the term of this patent is extended or adjusted under 35 U.S.C. 154(b) by 10 days.

(21) Appl. No.: 14/913,891

(22) PCT Filed: Aug. 26, 2013

(86) PCT No.: PCT/JP2013/072695
§ 371 (c)(1),
(2) Date: Feb. 23, 2016

(87) PCT Pub. No.: WO2015/029099
PCT Pub. Date: Mar. 5, 2015

(65) Prior Publication Data
US 2016/0200603 A1 Jul. 14, 2016

(51) Int. Cl.
*C02F 1/68* (2006.01)
*B01J 19/24* (2006.01)
(Continued)

(52) U.S. Cl.
CPC ............ *C02F 1/685* (2013.01); *B01J 19/24* (2013.01); *C01B 3/08* (2013.01); *B01J 2219/24* (2013.01);
(Continued)

(58) Field of Classification Search
CPC .............. B01J 19/24; C01B 3/08; C02F 1/68
See application file for complete search history.

(56) References Cited

U.S. PATENT DOCUMENTS

| 7,534,275 B2 * | 5/2009 | Tonca ................. B01J 8/009 423/648.1 |
| 2008/0026269 A1 * | 1/2008 | Shurtleff ............ H01M 8/04007 429/414 |

(Continued)

FOREIGN PATENT DOCUMENTS

| JP | 2004-243151 A | 9/2004 |
| JP | 2005-7380 A | 1/2005 |

(Continued)

OTHER PUBLICATIONS

International Search Report from International Application No. PCT/JP2013/072695 mailed Oct. 8, 2013.

*Primary Examiner* — Matthew Merkling
(74) *Attorney, Agent, or Firm* — Brundidge & Stanger, P.C.

(57) ABSTRACT

To provide a portable hydrogen-water generating pot that can generate highly concentrated drinkable hydrogen water anytime and anywhere in a short amount of time by using not only drinking water but also water or liquids, such as coffee, that have water as their major ingredient as raw water, wherein the portable hydrogen-water generating pot comprises a vessel's main body 1 made of a transparent cylindrical member 1a etc.; a fixed-quantity water supply means 2 provided in the lower part's upper layer block 1b located in the lower part of the vessel's main body, the fixed-quantity water supply means 2 supplying a certain quantity of water contained in the vessel's main body 1 to a chemical tank 6 created in the lower lid 1c of the lower part; a gas passage 4, equipped with a check valve 3, also provided in the lower part's upper layer block 1b, the gas passage 4 allowing hydrogen gas generated in the chemical tank 6 to move to the vessel's main body 1; a chemical tank 6, for containing a hydrogen-generating agent 5, arranged in the lower lid 1c that forms the lower layer of the lower part (Continued)

of the vessel's main body 1; an upper part block that forms the discharge port part 7 located in the upper part of the vessel's main body 1; and a lid 9, equipped with a pressure reducing valve 8, detachably and externally attached to the discharge port part 7.

12 Claims, 10 Drawing Sheets

(51) Int. Cl.
*C01B 3/08* (2006.01)
*C02F 1/70* (2006.01)

(52) U.S. Cl.
CPC   *C02F 1/68* (2013.01); *C02F 1/70* (2013.01); *Y02E 60/36* (2013.01)

(56) References Cited

U.S. PATENT DOCUMENTS

| | | | |
|---|---|---|---|
| 2008/0311225 A1* | 12/2008 | Shiga | C02F 1/4606 |
| | | | 424/682 |
| 2013/0112600 A1* | 5/2013 | Satoh | A23L 2/54 |
| | | | 210/136 |
| 2017/0022078 A1* | 1/2017 | Fukuoka | C01B 3/061 |
| 2017/0050867 A1* | 2/2017 | Kang | C02F 1/4676 |

FOREIGN PATENT DOCUMENTS

| | | |
|---|---|---|
| JP | 2009-172567 A | 8/2009 |
| JP | 2011-51656 A | 3/2011 |
| JP | 2012-176395 A | 9/2012 |
| JP | 2012-217868 A | 11/2012 |
| JP | 2013-22484 A | 2/2013 |
| WO | 2006/098405 A1 | 9/2006 |
| WO | 2011/158832 A1 | 12/2011 |

* cited by examiner

PORTABLE HYDROGEN-WATER GENERATING POT

CROSS REFERENCE TO RELATED APPLICATIONS

This application is a National Stage filing under 35 U.S.C. 371 of PCT Application No. PCT/JP2013/072695 filed Aug. 26, 2013, the entire disclosure of which is incorporated herein by reference.

TECHNICAL FIELD

The present invention relates to a portable pot for generating hydrogen water that can freely, easily, anytime and anywhere generate hydrogen water for drinking which includes hydrogen in a variety of liquids that have water as their major ingredient, such as drinking water, coffee, black tea, and green tea.

BACKGROUND ART

As portable, drinkable hydrogen-water generators, those so constructed in such a way that two electrodes are disposed at the lower part of a cylindrical vessel; water contained in the cylindrical vessel is electrolyzed generating hydrogen; and the hydrogen then dissolves into the water contained in the cylindrical vessel thereby generating hydrogen water, are commercially available. This commercially-available drinkable hydrogen-water generator is a charging type, and it is said that hydrogen water can be generated nearly 6 times per charge by using 0.3 liter of water that can be contained in the cylindrical vessel at each time. The time to generate hydrogen water is approximately 10 minutes.

Although it is agreed that those commercially-available drinkable hydrogen-water generators are portable, there are some problems: the time required for generating hydrogen water is slightly long (10 minutes); the concentration of hydrogen dissolved in the obtained hydrogen water is said to be 550 ppb (some advertisements say it is 1.16 ppm, which is approximately twice as much) and is not sufficiently high; and since their structure is such that raw water is electrolyzed to generate hydrogen molecules, raw water naturally comes in contact with the electrodes, and therefore, raw water is limited to mineral water or tap water, etc., so it is not appropriate to use coffee, tea, etc.

Patent document 1 relates to a drinkable hydrogen-water pot-type generator which comprises a pot for generated water, which stores raw water, and a base on which the pot for generated water is placed and to which electric power is supplied for electrolysis;

wherein the pot for generated water is equipped with a longitudinal water tank chamber, a small-volume reaction chamber is arranged at the bottom thereof, a communicating port is created between the water tank chamber and the reaction chamber, the reaction chamber is provided with a polymer membrane horizontally orientated to the water tank chamber, and the top and bottom of the polymer membrane are sandwiched by electrode plates made of perforated metal plates or metal nets, electrically-conducting springs are interposed between the electrode plates and electrode terminals disposed above and below, and the electrode terminals disposed above and below are faced to the base's ring-shaped electrode connector and dot-shaped electrode connector; and the base is equipped with the ring-shaped electrode connector and the dot-shaped electrode connector.

Therefore, according to the drinkable hydrogen-water pot-type generator in patent document 1, when needed, by supplying tap water etc. serving as raw water in the water tank chamber of the pot for generated water, placing the pot for generated water on the base and turning on the power, since raw water has entered into the reaction chamber through the communicating port, the water is electrolyzed generating hydrogen gas. Hydrogen gas slowly rises in the longitudinally-structured water tank chamber, and therefore, the hydrogen gas dissolves into the water well, and highly concentrated hydrogen water is said to be generated.

According to the explanation of the example of the drinkable hydrogen-water pot-type generator in patent document 1, it takes nearly 10 to 15 minutes to generate hydrogen water, and the concentration of hydrogen dissolved in the obtained hydrogen water is said to be 490 ppb when electricity is turned on for 10 minutes and 515 ppb when electricity is turned on for 15 minutes, and this is considered to be only slightly lower than the hydrogen water obtained by the above-mentioned commercially-available drinkable hydrogen-water generators.

Furthermore, the drinkable hydrogen-water pot-type generator in patent document 1 is not appropriate for carrying due to the structure, hydrogen water generation time is slightly long, 10 to 15 minutes, as stated above, and the concentration of hydrogen dissolved in the obtained hydrogen water is not considered high; slightly lower than the hydrogen water obtained by the commercially-available drinkable hydrogen-water generators as stated above. Furthermore, similar to the commercially-available drinkable hydrogen-water generators, the drinkable hydrogen-water pot-type generator in patent document 1 is also constructed in such a way that raw water is electrolyzed to generate hydrogen molecules; and this configuration naturally allows raw water to come in contact with the electrodes, and therefore, raw water is limited to mineral water or tap water, etc., and it is not appropriate to use coffee, tea, etc.

CITATION LIST

Patent Document

Patent document 1: Japanese Unexamined Patent Application Publication No. 2012-217868

SUMMARY OF INVENTION

Technical Problem

The present invention solves the above-mentioned problems of conventional technologies and provides a portable hydrogen-water generating pot that can generate highly concentrated drinkable hydrogen water anytime and anywhere in a short amount of time by using not only drinking water, such as mineral water or tap water, but also water or liquids, such as coffee or a variety of juices or teas, that have water as their major ingredient as raw water.

Solution to Problem

A first embodiment of the present invention provides a portable hydrogen-water generating pot comprising:

a vessel's main body easily seen through and containing water or a liquid having water as its major ingredient;

a gas passage equipped with a check valve, formed in the upper layer of the lower part of the vessel's main body, to feed hydrogen gas generated in a chemical tank located in the lower layer of the lower part to water or the liquid having water as its major ingredient contained in the vessel's main body to dissolve the hydrogen gas;

the chemical tank formed in the lower layer of the lower part of the vessel's main body to contain a hydrogen-generating agent that reacts with water to generate hydrogen;

a discharge port part created in the upper part of the vessel's main body; and a lid detachably and externally attached to the discharge port part and capable of reducing pressure in the vessel's main body before it is removed from the discharge port part.

A second embodiment of the present invention provides a portable hydrogen-water generating pot comprising:

a vessel's main body easily seen through and containing water or a liquid having water as its major ingredient;

a fixed-quantity water supply means for supplying a certain fixed-quantity of the water or liquid having water as its major ingredient contained in the vessel's main body to a chemical tank located in the lower layer of the lower part, and a gas passage equipped with a check valve to feed hydrogen gas generated in the chemical tank to water or the liquid having water as its major ingredient contained in the vessel's main body to dissolve the hydrogen gas, wherein both the fixed-quantity water supply means and the gas passage are formed in the upper layer of the lower part of the vessel's main body;

the chemical tank formed in the lower layer of the lower part of the vessel's main body to contain a hydrogen-generating agent that reacts with water to generate hydrogen;

a discharge port part created in the upper part of the vessel's main body; and a lid detachably and externally attached to the discharge port part, equipped with a pressure reducing valve to maintain pressure in the vessel's main body so that the pressure does not exceed a certain level, and capable of further reducing pressure in the vessel's main body before it is removed from the discharge port part.

A third embodiment of the present invention provides the portable hydrogen-water generating pot according to the second embodiment, wherein the fixed-quantity water supply means comprises a water supply channel arranged in the upper layer of the lower part of the vessel's main body and connecting the inside of the vessel's main body to the inside of the chemical tank located in the lower layer of the lower part;

a spherical body disposed in the middle of the water supply channel and provided with a fixed-quantity notch part which opens toward the inside of the vessel's main body in the normal state, opens toward the inside of the chemical tank by being turned when necessary, and is capable of containing a certain fixed-quantity of water or liquid having water as its major ingredient; and an operation means for turning the spherical body.

A fourth embodiment of the present invention provides the portable hydrogen-water generating pot according to embodiment 1, 2 or 3, wherein the chemical tank is created on the inner surface of the lower lid which is the lower layer of the lower part that detachably screws in the upper layer of the lower part of the vessel's main body.

Advantageous Effects of Invention

According to the portable hydrogen-water generating pot in accordance with the first embodiment of the present invention, a hydrogen-generating agent is first filled in the chemical tank, water or a liquid having water as its major ingredient is then injected into the vessel's main body, and a small amount of the water or liquid having water as its major ingredient in the vessel's main body is extracted, or a small amount of other water or liquid having water as its major ingredient is separately prepared; and by injecting either one into the chemical tank, the hydrogen-generating agent in the chemical tank quickly reacts with water in the water etc. and generates hydrogen gas.

Needless to say, the water etc. is injected into the vessel's main body from the discharge port after removing the lid and exposing the discharge port. The hydrogen-generating agent is charged in the chemical tank by following the procedure according to the configuration of the chemical tank.

When injecting water or a liquid having water as its major ingredient contained in the vessel's main body into the chemical tank, to describe the detail, the lid is removed from the discharge port, water etc. contained in the vessel's main body is extracted from the discharge port and is injected into the chemical tank. Although various means and methods can be freely adopted to extract water etc. from the vessel's main body, using a dropper etc. is advantageous because a fixed quantity can be easily extracted, and the extracted water etc. can also be easily injected into the chemical tank.

When injecting a small amount of water or liquid having water as its major ingredient separately prepared into the chemical tank, to describe the detail, for example, water or a liquid having water as its major ingredient contained in a small vessel is prepared in combination with a hydrogen-generating agent to be charged into the chemical tank, and then water etc. contained in the small vessel is injected into the chemical tank in which the hydrogen-generating agent is charged. Needless to say, also in this case, various other means and methods can be adopted; however, it is easy, reliable and advantageous to adopt this means that prepares a small vessel containing water etc. in combination with a hydrogen-generating agent.

Hydrogen gas generated by the reaction between the hydrogen-generating agent and water etc. in the chemical tank pervades the chemical tank and the space below the check valve in the gas passage. When gas pressure in that space exceeds a certain level, hydrogen gas moves to the upper side gas passage through the check valve and gradually dissolves into the water etc. contained in the vessel's main body connected to the gas passage, and residual hydrogen gas moves upward.

Although depending on the characteristics of the hydrogen-generating agent, normally, reaction with water can progress much quicker than by means of the electrolysis of water, and a large amount of hydrogen gas can be quickly generated. For example, a sufficient amount of hydrogen gas can be generated in nearly 3 minutes. Hydrogen gas thus generated moves, as stated above, to the vessel's main body via the check valve and the gas passage, dissolves into the water etc., and residual undissolved hydrogen gas moves up to the space above the upper surface of the water etc. in the vessel's main body. Although hydrogen gas pressure in this space gradually increases, normally, it does not increase up to 2 atmospheres. Since the vessel's main body is designed to withstand pressure of nearly 10 atmospheres, there is no fear that the vessel's main body will be ruptured by gas pressure.

As stated above, after a certain period of time, for example, nearly 3 minutes, has elapsed after water was injected by using a dropper etc. or from a small vessel and when a sufficient amount of hydrogen gas is considered to have been generated, it is appropriate to promote the dissolution of the hydrogen gas into water etc. by shaking it for 20 to 30 seconds, for example, to mix the water etc. and hydrogen gas contained therein. By doing so, the water etc. in the vessel's main body becomes hydrogen water in which hydrogen is dissolved at sufficiently high concentration. After that, by removing the lid that closes the discharge port and exposing the discharge port, hydrogen water contained therein can be drunk directly from the discharge port or poured into a glass for drinking.

Furthermore, due to the function of the lid, the lid is to be removed from the discharge port after releasing hydrogen gas having slightly high pressure that remains in the upper part of the vessel's main body. Thus, by decreasing atmospheric pressure in the vessel's main body before removing the lid from the discharge port, blowing up of hydrogen dissolved in water in the form of many small bubbles is allowed. Such situation in which many white bubbles are ejected and move upward can be observed from outside because the vessel's main body is designed to be transparent.

Furthermore, as stated above, since the vessel's main body is made of transparent material that allows the inside to be seen through, not only the above situation, but also situation in which hydrogen gas generated by the reaction between the hydrogen-generating agent and water etc. moves upward in the water etc. contained in the vessel's main body in the form of bubbles can be naturally observed.

Furthermore, according to the portable hydrogen-water generating pot in accordance with the first embodiment of the present invention, since hydrogen is not generated by means of electrolysis by disposing electrodes in the vessel's main body, it is possible to use coffee, teas, juices, etc. in addition to mineral water and tap water as raw water for generating hydrogen water. Moreover, when injecting raw water in the vessel's main body into the chemical tank to use it as water for generating hydrogen, there are inappropriate ingredients in relation to the nature of the hydrogen-generating agent, and therefore, a liquid having water, including such inappropriate ingredients, as its major ingredient cannot be used as raw water. However, if water etc. prepared separately is injected into the chemical tank to use it as water for generating hydrogen, any liquid can be freely adopted as raw water as far as it is a beverage having water as its major ingredient.

According to the portable hydrogen-water generating pot in accordance with the second embodiment of the present invention, in the same manner as the portable hydrogen-water generating pot in accordance with the first embodiment of the present invention, the chemical tank is filled with a hydrogen-generating agent and water or a liquid having water as its major ingredient is injected into the vessel's main body, then the specially-designed fixed-quantity water supply means is operated to inject a certain fixed-quantity of water etc. from the vessel's main body into the chemical tank, and then the hydrogen-generating agent in the chemical tank quickly reacts with water in the water etc., generating hydrogen gas.

The water etc. is injected from the discharge port after removing the lid in the same manner as the portable hydrogen-water generating pot in accordance with the first embodiment of the present invention. The hydrogen-generating agent is charged into the chemical tank located in the lower layer of the lower part by following the procedure according to the configuration of the chemical tank. It is natural that water etc. is injected by using the fixed-quantity water supply means after the lid has been externally attached to the discharge port.

Hydrogen gas generated by the reaction between the hydrogen-generating agent and water etc. in the chemical tank follows the same process as that of the portable hydrogen-water generating pot in accordance with the first embodiment of the present invention: the hydrogen gas moves to the upper side of the vessel's main body from the chemical tank through the check valve and the gas passage and gradually dissolves into the water etc. contained therein, and residual hydrogen gas moves upward.

As described in the portable hydrogen-water generating pot in accordance with the first embodiment of the present invention, although depending on the characteristics of the hydrogen-generating agent, normally, a sufficient amount of hydrogen gas can be generated quicker than by means of the electrolysis of water, for example, in nearly 3 minutes. Hydrogen gas thus generated moves, as stated above, to the vessel's main body via the check valve etc., dissolves into the water etc., and residual undissolved hydrogen gas moves upward to the space above the upper surface of the water etc. in the vessel's main body. Although hydrogen gas pressure in this space gradually increases, the lid that closes the discharge port located in the upper part is equipped with a pressure reducing valve which releases hydrogen gas having a pressure more than a certain level and keeping the pressure in the space below a certain level of pressure; therefore, pressure in the vessel's main body is kept below a certain level.

As stated above, after a certain period of time, for example, nearly 3 minutes, has elapsed after water was injected by operating the fixed-quantity water supply means and when a sufficient amount of hydrogen gas is considered to have been generated, it is appropriate to promote the dissolution of the hydrogen gas into water etc. by shaking it for 20 to 30 seconds, for example, to mix the water etc. and hydrogen gas contained therein. By doing so, the water etc. in the vessel's main body becomes hydrogen water in which hydrogen is dissolved at sufficiently high concentration. After that, by removing the lid that closes the discharge port and exposing the discharge port, hydrogen water contained therein can be drunk directly from the discharge port or poured into a glass for drinking.

Other actions and effects of the portable hydrogen-water generating pot in accordance with the second embodiment of the present invention are the same as those of the hydrogen-water generating pot in accordance with the first embodiment of the present invention.

According to the portable hydrogen-water generating pot in accordance with the third embodiment of the present invention, it is possible to easily and reliably inject an appropriate amount of water etc. contained in the vessel's main body into the chemical tank.

According to the portable hydrogen-water generating pot in accordance with the fourth embodiment of the present invention, the chemical tank is arranged on the inner surface of the lower lid that detachably screws in the upper layer of the lower part of the vessel's main body; therefore, it is extremely easy to charge the hydrogen-generating agent into the chemical tank.

DESCRIPTION OF EMBODIMENTS

Figure 1:
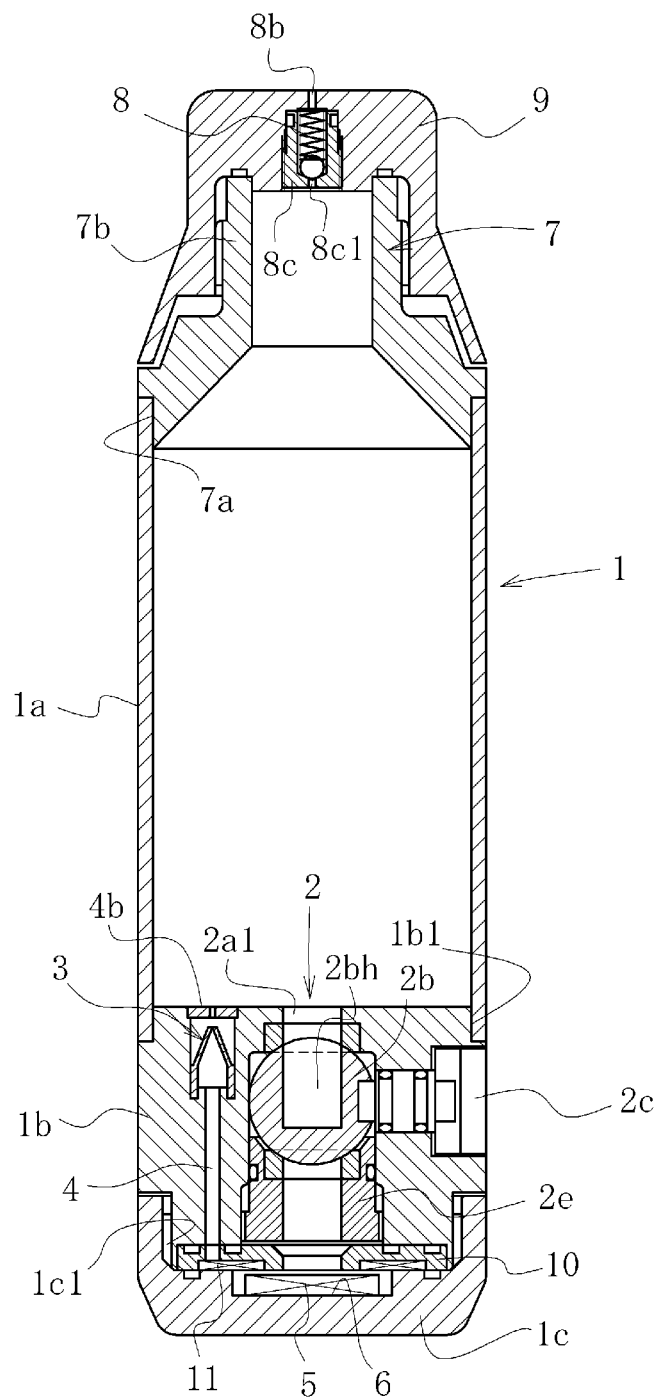
FIG. 1 is a longitudinal sectional view of the portable hydrogen-water generating pot in example 1.

Embodiments to implement the present invention will be described in detail by referring to the drawings based on two examples. The portable hydrogen-water generating pot in example 1 is an example to which the second embodiment of the present invention is applied, and the portable hydrogen-water generating pot in example 2 is an example to which the first embodiment of the present invention is applied.

Example 1

Figure 2:
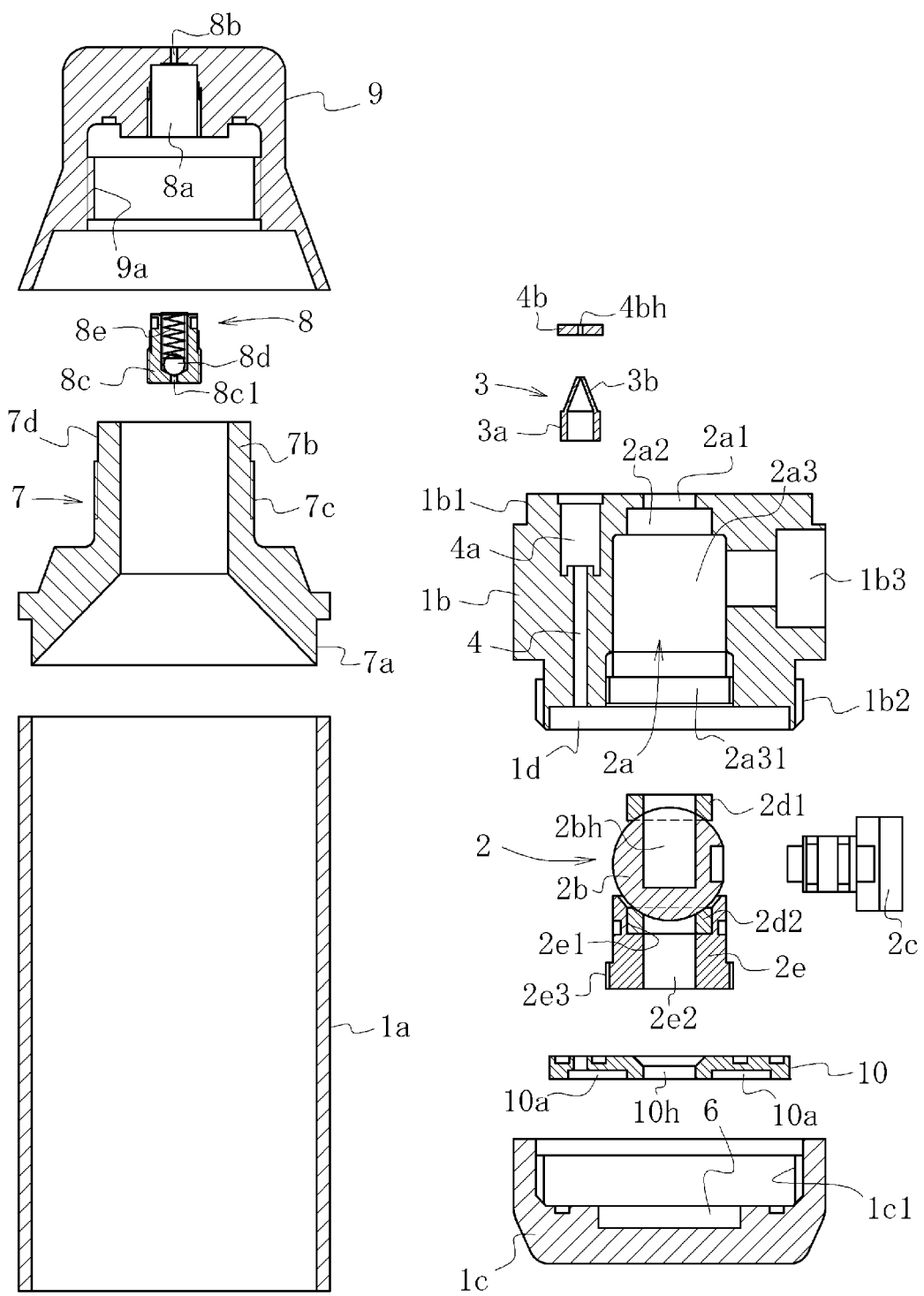
FIG. 2 is an exploded longitudinal sectional view of the portable hydrogen-water generating pot in example 1.
Figure 3:
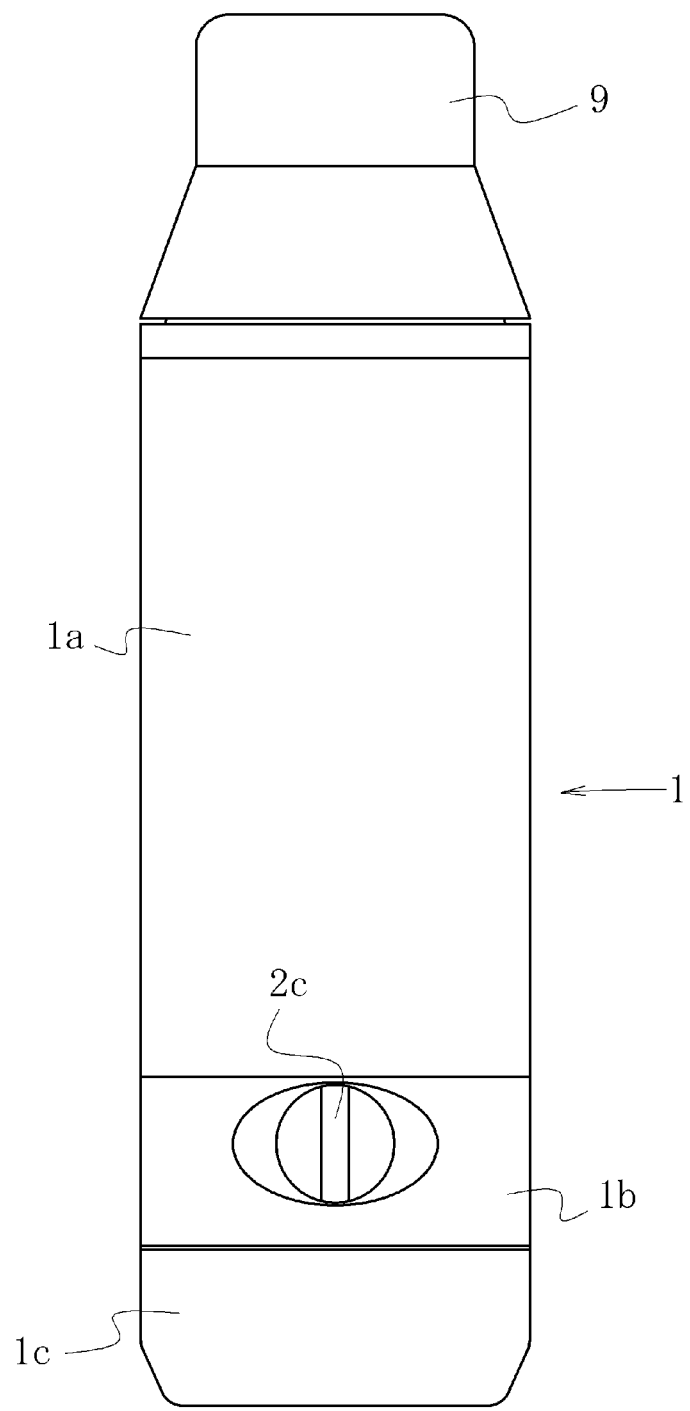
FIG. 3 is a right side view of the portable hydrogen-water generating pot in example 1.

As shown in FIG. 1 to FIG. 3, the portable hydrogen-water generating pot in example 1 basically comprises a vessel's main body 1; a fixed-quantity water supply means 2 arranged in the upper layer of the lower part of the vessel's main body 1; a gas passage 4, equipped with a check valve 3, similarly arranged in the upper layer of the lower part of the vessel's main body 1; a chemical tank 6 for containing a hydrogen-generating agent 5 arranged in the lower layer of the lower part of the vessel's main body 1; a discharge port part 7 provided in the upper part of the vessel's main body 1; and a lid 9, equipped with a pressure reducing valve 8, detachably and externally attached to the discharge port part 7.

As shown in FIG. 1 to FIG. 3, the vessel's main body 1 comprises a cylindrical member 1a made of transparent plastic; a lower part's upper layer block 1b forming the upper layer of the lower part which is the bottom part of the cylindrical member 1a; a lower lid 1c, equipped with the chemical tank 6, which is a lower part's lower layer block; and a discharge port part 7 located in the discharge port block of the upper part.

As shown in FIG. 1 and FIG. 2, the lower part's upper layer block 1b is basically a short cylindrical member having the same outer diameter as that of the cylindrical member 1a and is provided with a connecting small-diameter portion 1b1 having almost the same outer diameter as the inner diameter of the cylindrical member 1a by cutting off the upper side outer periphery. As shown in these drawings, the lower part of the cylindrical member 1a is externally attached to the connecting small-diameter portion 1b1, thereby forming the upper layer of the lower part located at the bottom of the vessel's main body 1. The engagement coupling portion of the lower part of the cylindrical member 1a and the connecting small-diameter portion 1b1 is immobilized with an adhesive. Furthermore, the outer periphery of the lower part of the lower part's upper layer block 1b is cut off to form a small-diameter portion; and the outer periphery is threaded to create a connecting male thread part 1b2 that screws in a connecting female thread part 1c1 of the lower lid 1c. At the bottom surface of the lower part's upper layer block 1b, a concave portion 1d that forms a clearance space, described later, is created so as to accommodate a filter retainer 10. Moreover, the fixed-quantity water supply means 2 and the gas passage 4 provided with the check valve 3 are arranged in the lower part's upper layer block 1b, which gas passage 24 will be described in detail later.

Also as shown in FIG. 1 to FIG. 3, the lower lid 1c is basically a thin circular member in planar view having the same outer diameter as that of the cylindrical member 1a, and a screw thread is created on the inner surface of the peripheral side portion which rises along the peripheral edge to create the connecting female thread part 1c1 that screws onto the connecting male thread part 1b2 located on the lower side outer periphery of the lower part's upper layer block 1b.

The discharge port block forming the discharge port part 7 is constructed in such a way that the lowermost outer periphery having the same outer diameter as that of the cylindrical member 1a is cut off to create a connecting small-diameter portion 7a having almost the same size as the inner diameter of the cylindrical member 1a, and as shown in FIG. 1 and FIG. 2, the upper part of the cylindrical member 1a is externally attached to the connecting small-diameter portion 7a, coupling the both parts. The coupling portion is immobilized with an adhesive. As shown in FIG. 1 and FIG. 2, the discharge port block is equipped with a small cylindrical part 7b formed in such a way that a small portion having the same diameter as that of the cylindrical member 1a located above the lowermost connecting small-diameter portion 7a is left as it is, and the small cylindrical part 7b slightly rises from the upper end in an upwardly-tapered conical shape and extends upward from the upper end via a level difference, and the outer periphery of the small cylindrical part 7b is threaded to create a connecting male thread 7c that screws in the connecting female thread 9a located on the inner periphery of the lid 9. Furthermore, the connecting male thread 7c is provided with two longitudinal grooves extending from the upper end to the lower end at angle intervals of 180 degrees in the peripheral direction. Moreover, the inside of the discharge port block forming the discharge port part 7 is created in an upwardly-tapered shape from the lowermost part to the vicinity of the lowermost end of the small cylindrical part 7b, and the inside of the small cylindrical part 7b located above is formed on the cylindrical inner surface which has the same diameter to the upper end.

The lower part's upper layer block 1b, the lower lid 1c which is the lower layer of the lower part, and the discharge port block which is the discharge port part 7 are, in the same manner as the cylindrical member 1a, made of transparent plastic material in example 1. Also in example 1, the capacity of 350-ml water can be contained in the space from the upper surface of the lower part's upper layer block 1b that forms the bottom surface of the vessel's main body 1 to the lower end of the discharge port block that forms the discharge port part 7. Needless to say, the capacity is not intended to be limited to the above-mentioned capacity.

As shown in FIG. 1 and FIG. 2, the fixed-quantity water supply means 2 comprises a water supply channel 2a which is provided in the central part of the lower part's upper layer block 1b to connect an inner space of the vessel's main body 1 to the inside of the chemical tank 6 located in the lower lid 1c; a spherical body 2b which is located at the slightly upper part in the water supply channel 2a and has a fixed-quantity notch part 2bh; and a knob (operation means) 2c for turning the spherical body 2b.

As shown in FIG. 1 and FIG. 2, the water supply channel 2a is a hole that vertically penetrates the central part of the lower part's upper layer block 1b. The water supply channel 2a comprises a small-diameter feed port 2a1 located in the uppermost part; a valve seat arrangement part 2a2 which is provided directly thereunder and has a slightly larger diameter than the small-diameter feed port 2a1; and a large-diameter insertion hole 2a3 which extends from directly under the valve seat arrangement part 2a2 to the lowermost part and has the same diameter as that of the spherical body 2b. The inner periphery of the lowermost part of the large-diameter insertion hole 2a3 is threaded to create a female thread part 2a31 that screws onto the male thread 2e3 located on the outer periphery of the lower part retainer member 2e equipped with a valve seat arrangement part 2e1 in the upper part thereof.

In the valve seat arrangement part 2a2 of the water supply channel 2a, an upper valve seat 2d1 with a through-hole having the same diameter as that of the small-diameter feed port 2a located in the uppermost part is disposed, the spherical body 2b is disposed directly under the upper valve seat 2d1 in an abutting state, and a lower part retainer member 2e, in which a lower valve seat 2d2 is disposed in the valve seat arrangement part 2e1 located in the upper part, is disposed in the large-diameter insertion hole 2a3 located below, thereby closely and rotatably supporting the spherical body 2b by the upper side upper valve seat 2d1 and the lower side lower valve seat 2d2. The lower part retainer member 2e is, needless to say, fixed at that position by screwing the male thread 2e3 located on the lower side outer periphery into the female thread part 2a31 located on the lowermost part outer periphery of the large-diameter insertion hole 2a3.

Herein, the lower part retainer member 2e is a short cylindrical member and constructed in such a way that the lower side outer periphery is provided with a male thread 2e3 which screws into a female thread part 2a31 of the large-diameter insertion hole 2a3 of the water supply channel 2a, a through-hole 2e2 having the same diameter as that of the small-diameter feed port 2a1 vertically penetrates inside, and the valve seat arrangement part 2e1 having a larger diameter than the through-hole 2e2 is arranged in the uppermost part. Furthermore, in the central part of the lower valve seat 2d2, a through-hole is created which has a similar diameter as that of the upper valve seat 2d1, that is, the same diameter as that of the small-diameter feed port 2a1.

Regarding the water supply channel 2a, above the spherical body 2b, both the small-diameter feed port 2a1 and the through-hole of the upper valve seat 2d1 provided in the water supply channel 2a are substantially functioning. Below the spherical body 2b, the through-hole of the lower valve seat 2d2 and the through-hole 2e2 of the lower part retainer member 2e each disposed in the water supply channel 2a are substantially functioning as a water supply channel.

As stated above and shown in FIG. 1 and FIG. 2, a fixed-quantity notch part 2bh is created in the spherical body 2b. In example 1, the fixed-quantity notch part 2bh is a square notch with a capacity of approximately 2.5 cc and constructed in such a way that it faces upward in the normal state, which means it opens toward the inside of the vessel's main body 1, and when necessary, by turning the spherical body 2b by 180 degrees around an axis that penetrates the spherical body 2b and is perpendicular to the length direction of the vessel's main body 1, the fixed-quantity notch part 2bh can be opened toward the chemical tank 6. Herein, it is obvious that the capacity of the fixed-quantity notch part 2bh is not intended to be limited to the above-mentioned approximately 2.5 cc.

As shown in FIG. 1 to FIG. 3, the knob 2c is a turning operation means which is connected to the tip of the axial body connected to the spherical body 2b in such a way that the axis of the axial body penetrates the center of the spherical body 2b and is perpendicular to the length direction of the vessel's main body 1 and that the knob 2c is located in the opening for operation 1b3 that opens toward the side of the lower part's upper layer block 1b.

Figure 5:
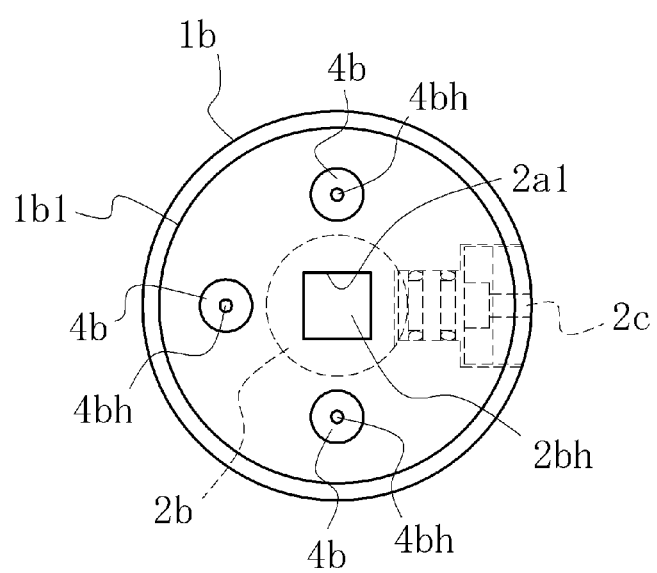
FIG. 5 is a plan view of the lower part's upper layer block of the portable hydrogen-water generating pot in example 1.

As shown in FIG. 1, FIG. 2 and FIG. 5, the gas passage 4 is a passage created in the lower part's upper layer block 1b so as to connect the inside of the vessel's main body 1 and the inside of the chemical tank 6, and in example 1, three gas passages are created around the water supply channel 2a. The three gas passages 4, 4, 4 are created along the periphery side of the lower part's upper layer block 1b at angle intervals of 90 or 180 degrees mutually. As shown in FIG. 1 and FIG. 2, a large-diameter valve arrangement part 4a is provided in the upper part of each gas passage 4; the valve arrangement part 4a is equipped with a check valve 3; and a divider plate 4b provided with a small-diameter gas passing small hole 4bh at the center thereof is firmly mounted to the uppermost part of the valve arrangement part 4a.

As shown in FIG. 1 and FIG. 2, the check valve 3 comprises a cylindrical base 3a fixed to the lower part of the valve arrangement part 4a and an elastic valve 3b extending from the upper end of the base upwardly in a conical shape, and is a valve member constructed in such a way that if gas pressure over a certain level of pressure is applied from below, the tip of the elastic valve 3b opens allowing the gas to pass upward, and if water pressure is applied from above due to water etc. contained in the vessel's main body 1, the check valve would not open.

Figure 4:
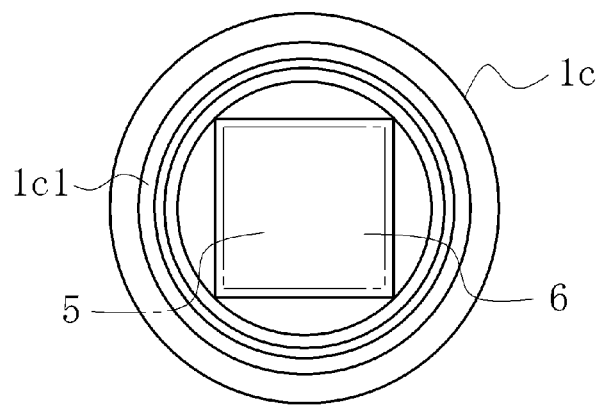
FIG. 4 is a plan view of the lower lid of the portable hydrogen-water generating pot in example 1.

As stated above and shown in FIG. 1, FIG. 2 and FIG. 4, the chemical tank 6 is formed as a square concave portion in planar view in the central part of the inner surface of the lower lid 1c. The size, that is, the length of the vertical and horizontal sides and the depth, corresponds to the size of the hydrogen-generating agent 5 contained therein, and the chemical tank 6 is created slightly larger than that size. As stated above and shown in FIG. 1 and FIG. 2, the lower lid 1c is attached to the lower part of the lower part's upper layer block 1b by screwing the connecting female thread part 1c1 located on the inner surface of the peripheral side onto the connecting male thread part 1b2 located on the outer periphery of the lower part of the lower part's upper layer block 1b; however, as stated above, the concave portion 1d is created on the bottom surface of the lower part's upper layer block 1b; therefore, in this mounting state, a certain amount of empty clearance space is created between the upper surface around the periphery of the chemical tank 6 and the bottom surface of the lower part's upper layer block 1b (upper surface of the concave portion 1d). Thus, a filter retainer 10 is disposed in the certain amount of clearance space provided due to the concave portion 1d.

As shown in FIG. 1 and FIG. 2, the filter retainer 10 is a flat plate member wherein a communicating hole 10h, which connects the through-hole 2e2 of the lower part retainer member 2e created at the center of the bottom surface of the lower part's upper layer block 1b to the chemical tank 6 of the lower lid 1, is created at the center; and an annular filter storage part 10a, wherein a part of it opens downward toward the chemical tank 6 and the other part has apertures connected to the gas passages 4, 4, 4, is provided on the bottom surface of the periphery of the communicating hole 10*h*. The filter storage part 10*a* is a space for storing a filter 11 that allows hydrogen gas generated in the chemical tank 6 to pass through and performs control so that a foreign object, such as a hydrogen-generating agent 5, stored in the chemical tank 6 will not move toward the gas passages 4, 4, 4.

Furthermore, on the upper surface of the filter retainer 10, annular grooves 10*b*, 10*c* are created to engage with o-rings outside and inside the apertures that connect to the gas passages 4, 4, 4.

As shown in FIG. 1 to FIG. 3, the lid 9 comprises a lower part extending in a tapered shape and an upper part rising upward cylindrically. The almost half of the tapered-shaped lower part serves as a skirt part 9*b* that covers the upwardly-tapered conical part and a level difference of the discharge port block of the vessel's main body 1, and as stated above, a connecting female thread 9*a* is created on the inner periphery of the upper part of the lid so as to screw onto the connecting male thread 7*c* located on the outer periphery of the small cylindrical part 7*b* in the upper part block that forms the discharge port part 7. As stated above and shown in FIG. 1 and FIG. 2, a pressure reducing valve 8 is disposed at the central part of the lid 9 to prevent atmospheric pressure in the vessel's main body 1 from becoming higher than a certain level, 2 atmospheres in example 1. Furthermore, an annular groove 9*h* is created into which an o-ring is inserted in a portion of the lid 9 that abuts the upper end of the small cylindrical part 7*b* when the lid 9 is mounted to the discharge port part 7.

As shown in FIG. 1 and FIG. 2, the pressure reducing valve 8 comprises a mounting hole 8*a* which opens downward toward the inner side at the center of the lid 9; a smaller diameter leak hole 8*b* which connects to the outside air at the center of the upper end of the mounting hole 8*a*; a mounting tube 8*c* provided with a valve hole 8*c*1 penetrating outside and inside at the center of the lower end; a valve ball 8*d* inserted into the lowermost part of the mounting tube 8*c* in such a way that the valve hole 8*c*1 is closed; and a compressing spring 8*e* which presses the valve ball 8*d* toward the valve hole 8*c*1. A female thread is created on the inner periphery surface of the mounting hole 8*a*, and a male thread is created on the outer periphery of the mounting tube 8*c* so as to screw into the female thread located on the inner periphery surface of the mounting hole 8*a*; and as stated above, the pressure reducing valve 8 is constructed in such a way that a mounting tube 8*c* into which the valve ball 8*d* and the compressing spring 8*e* are inserted is screwed into the mounting hole 8*a* and fixed. Herein, as stated above, by screwing the mounting tube 8*c* into the mounting hole 8*a* and fixing it, the upper end of the compressing spring 8*e* abuts the upper end of the mounting hole 8*a*, thereby achieving the state in which the compressing spring 8*e* can press the valve ball 8*d* downward at the lower end thereof.

For the hydrogen-generating agent 5, any hydrogen-generating agent which reacts with water to generate hydrogen gas can freely adopted. A type of hydrogen-generating agent which reacts quickly in a short amount of time is preferable. In example 1, a mixture of aluminum, calcium oxide and magnesium was adopted.

To slightly describe in detail, the hydrogen-generating agent was formed by mixing fine powder magnesium (Mg), aluminum (Al) and calcium oxide (CaO), and as a whole, 1-gram of hydrogen-generating agent was packaged in such a way that water and gas can pass through the package.

When water is added to the hydrogen-generating agent 5, calcium oxide reacts with water, generating heat, and subsequently generating calcium hydroxide. Fine powder aluminum also reacts with water, generating aluminum hydroxide and hydrogen and then generating heat. When added water becomes a basic water solution due to the generation of the calcium hydroxide, fine powder aluminum is considered to also generate a different reaction in which it reacts with water, generating aluminum hydroxide and hydrogen. When the added water reaches a high temperature, the magnesium reacts with the high-temperature water and generates magnesium hydroxide and hydrogen. Thus, when water is added to the hydrogen-generating agent 5, a large amount of hydrogen gas is generated.

Therefore, according to the portable hydrogen-water generating pot in example 1, when producing hydrogen water, the chemical tank 6 is first filled with the hydrogen-generating agent 5, and water or a liquid, such as coffee that has water as its major ingredient, which is to be made into hydrogen water, is injected into the vessel's main body 1. Mineral water was used in example 1.

The lower lid 1*c* located in the lower part of the vessel's main body 1 is removed and the hydrogen-generating agent 5 is charged into the chemical tank 6 located on the upper surface of the lower lid, and the lower lid 1*c* is then attached to the bottom of the lower part's upper layer block 1*b* located in the lower part of the vessel's main body 1. Needless to say, this is done by unscrewing or screwing the connecting female thread part 1*c*1 of the lower lid 1*c* from or onto the connecting male thread part 1*b*2 in the lower part's upper layer block 1*b*. Furthermore, the lid 9 is removed from the discharge port part 7 of the vessel's main body 1, and the mineral water is injected from the exposed upper end opening of the small cylindrical part 7*b* of the discharge port block that forms the discharge port part 7. After that, the lid 9 is externally attached to the discharge port part 7 in the same manner. By screwing the connecting female thread 9*a* of the lid 9 onto the connecting male thread 7*c* located on the outer periphery of the small cylindrical part 7*b*, the lid 9 is fixed in the above-mentioned externally-covering state.

Hydrogen water can be produced anytime after the above procedures; however, it is appropriate to produce hydrogen water at the time when drinking of it is desired.

when producing hydrogen water, the knob 2*c* of the fixed-quantity water supply means 2 is turned by 180 degrees, a certain quantity of mineral water contained in the vessel's main body 1 is then injected into the chemical tank 6, and the mineral water reacts with a hydrogen-generating agent 5 located therein. Mineral water contained in the vessel's main body 1 has entered into the upper part of the water supply channel 2*a*, in exact detail, in the fixed-quantity notch part 2*bh* of the spherical body 2*b*, through the small-diameter introduction passage 2*a*1 and the through-hole of the upper valve seat 2*d*1; and as stated above, by turning the knob 2*c* by 180 degrees, the fixed-quantity notch part 2*bh* containing mineral water is turned toward the chemical tank 6 from the inner side of the vessel's main body 1, and a certain quantity (approximately 2.5 cc in example 1) of mineral water contained therein is injected into the lower part of the water supply channel 2*a*, in exact detail, into the chemical tank 6, through the through-hole of the lower valve seat 2*d*2, through-hole 2*e*2 of the lower part retainer member 2, and the communicating hole 10*h* of the filter retainer 10.

When mineral water is thus injected into the chemical tank 6, the hydrogen-generating agent 5 filling it quickly reacts with the water, generating hydrogen gas. Hydrogen gas generated therein is to pervade the chemical tank 6, through-hole of the lower valve seat 2d2, through-hole 2e2 of the lower part retainer member 2e, and below the check valves 3, 3, 3 of the gas passages 4, 4, 4; however, when gas pressure therein finally exceeds a certain level due to the continuous generation of hydrogen gas, the hydrogen gas moves to the upper side of the gas passages 4, 4, 4 through the check valves 3, 3, 3, gradually dissolves into the mineral water in the vessel's main body 1 to which the gas passages 4, 4, 4 are connected, and residual hydrogen gas is to move upward.

Herein, a filter 11 supported by a filter storage part 10a of a filter retainer 10 is interposed between the chemical tank 6 and the gas passages 4, 4, 4, and hydrogen gas moves, as stated above, through the filter 11. Therefore, if package of powder etc. of the hydrogen-generating agent 5 in the chemical tank 6 is broken or so and the content comes out from the package, there is no possibility that the content will enter into the vessel's main body 1.

With regard to the generation of hydrogen gas, on the level of hydrogen generation possible in a portable device, although depending on the characteristics of the hydrogen-generating agent 5, reaction with water can progress much quicker than by means of the electrolysis of water, and a large amount of hydrogen gas can be quickly generated. In example 1, by turning the knob 2c by 180 degrees and injecting approximately 2.5-cc mineral water into the chemical tank 6, a sufficient amount of hydrogen gas can be generated when approximately 3 minutes have elapsed from the point of time water was injected.

Hydrogen gas thus generated moves to the vessel's main body 1 through the check valves 4, 4, 4 as stated above, moves upward while dissolving into the mineral water, and residual undissolved hydrogen gas moves to a space above the upper surface of the mineral water contained in the vessel's main body 1. Although the pressure of hydrogen gas etc. in the space gradually increases, a pressure reducing valve 8 is disposed at the central part of the lid 9 which closes the upper end opening of the small cylindrical part 7b located above, and if atmospheric pressure increases and exceeds 2 atmospheres, as stated above, that level of hydrogen gas etc. is released so as to keep the inner pressure at 2 atmospheres or lower. Thus, it is possible to control the pressure to prevent the pressure from increasing too high.

As stated above, after a certain period of time, that is, 3 minutes, when a sufficient amount of hydrogen gas is considered to have been generated after water was injected by using the knob 2c of the fixed-quantity water supply means 2, has elapsed, by shaking the vessel's main body 1 for 20 to 30 seconds and mixing the mineral water and hydrogen gas contained therein, it is possible to promote the dissolution of the hydrogen gas into the mineral water. Consequently, mineral water in the vessel's main body 1 becomes hydrogen water in which hydrogen is dissolved at sufficiently high concentration. For example, at a water temperature of 15° C. or higher, the concentration of hydrogen in mineral water contained in the vessel's main body 1 is 0.9 to 1.1 ppm (ratio by weight) before the mixing operation by shaking the vessel's main body 1 and 1.3 to 1.6 ppm (ratio by weight) after the mixing operation. Although the concentration of hydrogen in the mineral water is sufficiently high before the mixing operation, it can be made higher by mixing operation.

After that, when serving drinkable hydrogen water contained in the vessel's main body 1 for drinking, the lid 9 which is externally attached to the discharge port part 7 to close the upper end opening of the small cylindrical part 7b is to be loosened by turning it in the removal direction. When the lid 9 has been loosened, an o-ring inserted into the annular groove 9h located on the bottom surface of the lid 9 that has been tightly pressed to the upper end of the small cylindrical part 7b is detached from the upper end of the small cylindrical part 7, and the vessel's main body 1 loses airtightness. Once airtightness of the vessel's main body 1 is lost, high-pressure hydrogen gas remaining in the upper part of the vessel's main body 1 flows out through two longitudinal grooves created on the connecting male thread 7c located on the outer periphery of the small cylindrical part 7b, thereby decreasing the atmospheric pressure in the vessel's main body 1. Once atmospheric pressure in the vessel's main body 1 decreases, a certain quantity of hydrogen that has been dissolved in the mineral water is ejected in the form of many small bubbles and moves upward. Since the vessel's main body 1 is transparent, the upward movement of many small hydrogen gas bubbles can be seen from outside.

As stated above, by loosening and removing the lid 9 after releasing slightly high-pressure hydrogen gas, it is possible to drink mineral water-based hydrogen water. After that, the hydrogen water can be drunk directly from the upper end opening of the small cylindrical part 7b serving as a discharge port or poured into a glass for drinking.

As stated above, since the vessel's main body 1 is made of plastic material that allows the inside to be seen through, not only the above-mentioned situation when the lid 9 is removed to drink hydrogen water, but also the situation in which hydrogen gas generated by a reaction between the hydrogen-generating agent 5 and water is ejected in the form of bubbles and moves upward in the mineral water contained in the vessel's main body 1 can also be observed.

Furthermore, according to the portable hydrogen-water generating pot in example 1, since hydrogen is not generated by means of electrolysis by disposing electrodes in the vessel's main body 1, not only the above-mentioned mineral water and tap water, but also coffee, teas, juices, etc. can be used as raw water for generating hydrogen water.

Example 2

Figure 6:
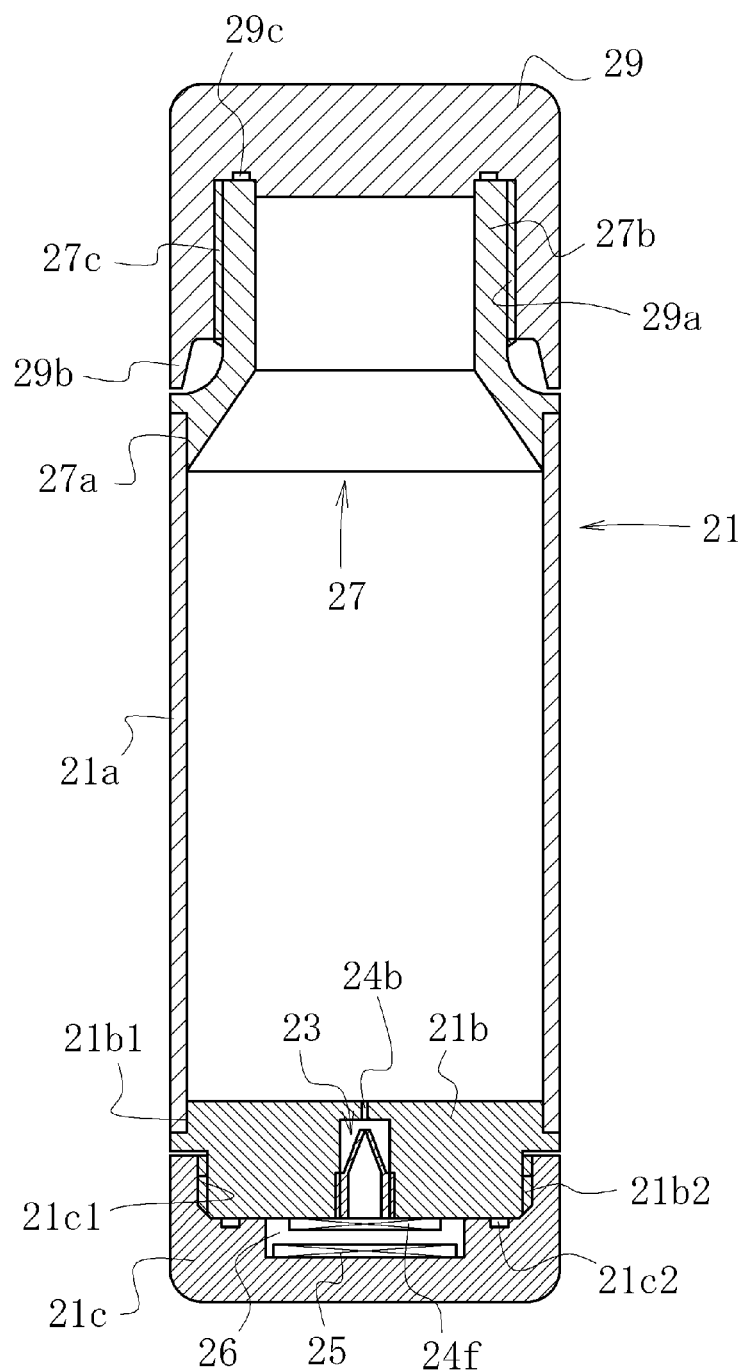
FIG. 6 is a longitudinal sectional view of the portable hydrogen-water generating pot in example 2.
Figure 7:
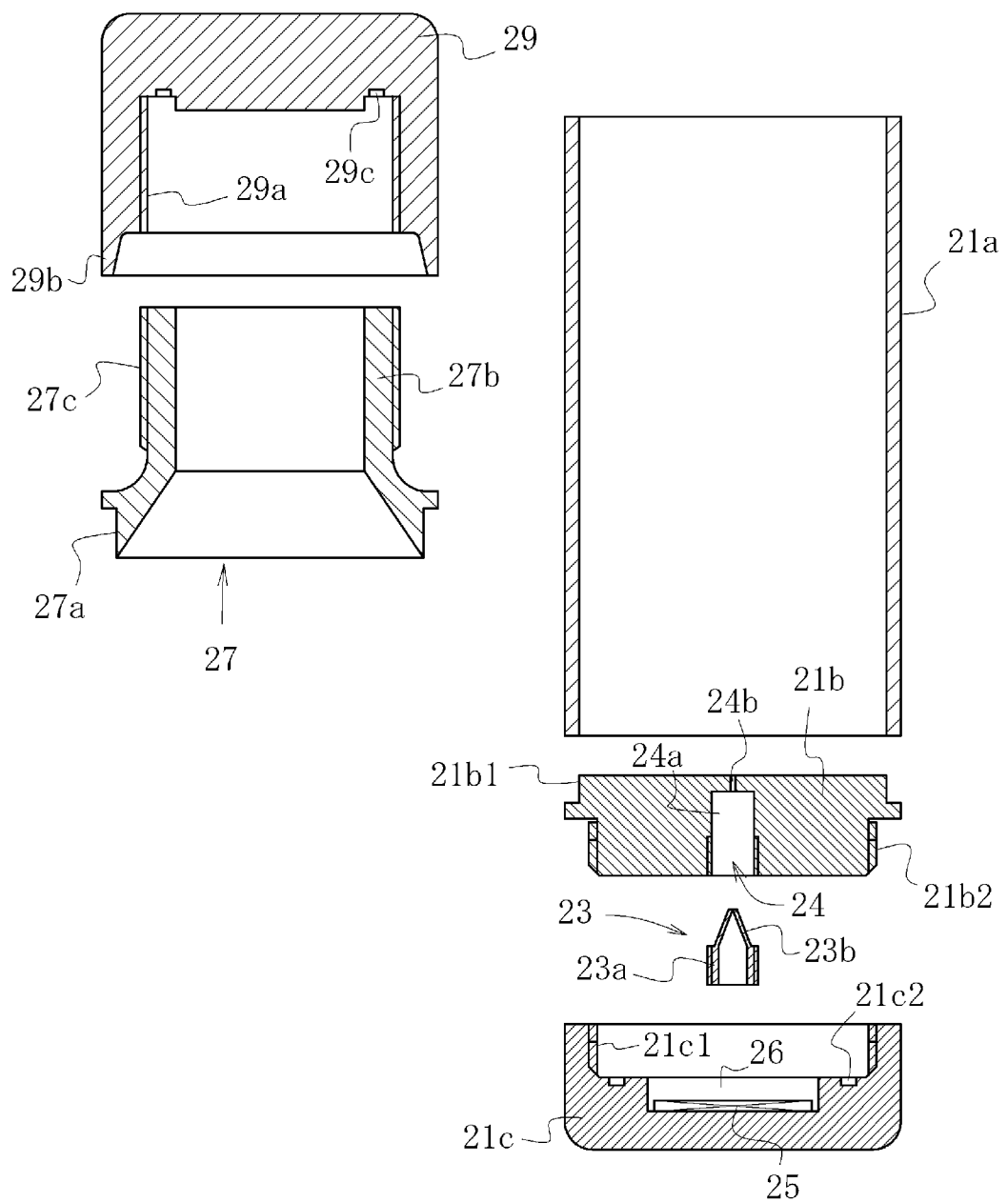
FIG. 7 is an exploded longitudinal sectional view of the portable hydrogen-water generating pot in example 2.
Figure 8:
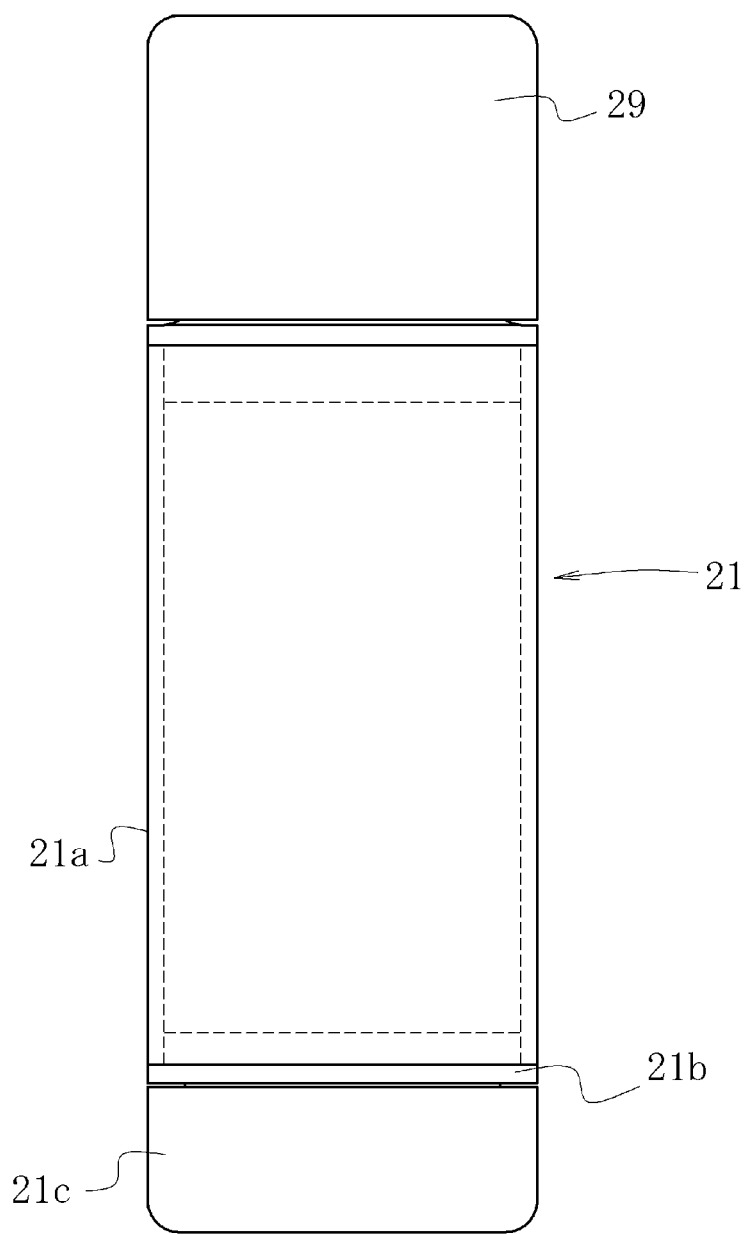
FIG. 8 is a front view of the portable hydrogen-water generating pot in example 2.

As shown in FIG. 6 to FIG. 8, the portable hydrogen-water generating pot in example 2 basically comprises a vessel's main body 21; a gas passage 24, equipped with a check valve 23, arranged in the upper layer of the lower part of the vessel's main body 21; a chemical tank 26 for containing a hydrogen-generating agent 25 arranged in the lower layer of the lower part of the vessel's main body 21; a discharge port part 27 arranged in the upper part of the vessel's main body 21; and a lid 29 detachably and externally attached to the discharge port part 27.

As shown in FIG. 6 to FIG. 8, the vessel's main body 21 comprises a cylindrical member 21a made of transparent plastic; a lower part's upper layer block 21b forming the upper layer of the lower part which is the bottom part of the cylindrical member; a lower lid 21c, provided with the chemical tank 26, which is a lower part's lower layer block; and the discharge port part 27 of the discharge port block in the upper part.

As shown in FIG. 6 and FIG. 7, the lower part's upper layer block 21b is basically a short cylindrical member having the same outer diameter as that of the cylindrical member 21a and is provided with a connecting small-diameter portion 21b1 having almost the same size as the inner diameter of the cylindrical member 21a by cutting off the upper side outer periphery. As shown in those drawings, the lower part of the cylindrical member 21a is externally attached to the connecting small-diameter portion 21b1 to form the upper layer of the lower part located at the bottom of the vessel's main body 21. The coupling portion of the lower side inner periphery of the cylindrical member 21a and the connecting small-diameter portion 21b1 of the lower part's upper layer block 21b is immobilized with an adhesive.

Furthermore, the outer periphery of the lower part of the lower part's upper layer block 21b is also cut off to form a small-diameter portion, and the outer periphery is threaded to create a connecting male thread part 21b2 that screws into a connecting female thread part 21c1 of the lower lid 21c. The gas passage 24 equipped with the check valve 23 is disposed in the lower part's upper layer block 21b, which gas passage 24 will be described in detail later.

Also as shown in FIG. 6 to FIG. 8, the lower lid 21c is basically a thin circular member in planar view having the same outer diameter as that of the cylindrical member 21a, and a screw thread is created on the inner surface of the peripheral side plate, which rises along the peripheral side, to create the connecting female thread part 21c1 that screws onto the connecting male thread part 21b2 located on the lower side outer periphery of the lower part's upper layer block 21b.

The discharge port block forming the discharge port part 27 is constructed in such a way that the lowermost outer periphery having the same outer diameter as that of the cylindrical member 21a is cut off to create a connecting small-diameter portion 27a having almost the same size as the inner diameter of the cylindrical member 21a, and as shown in FIG. 6 and FIG. 7, the upper part of the cylindrical member 21a is externally attached to the connecting small-diameter portion 27a, coupling the both parts. The coupling portion is fixed by bonding together.

As shown in FIG. 6 and FIG. 7, the discharge port block forming the discharge port part 27 is provided with a small cylindrical part 27b created in such a way that a small portion, having the same diameter as that of the cylindrical member 21a, located above the lowermost connecting small-diameter portion 27a is left as it is, and the small cylindrical part 27b gradually rises from the upper end in an upwardly-tapered conical shape and then extends upward from the upper end, and the outer periphery of the small cylindrical part 27b is threaded to create a connecting male thread 27c that screws into the connecting female thread 29a located on the inner periphery of the lid 29.

Furthermore, the connecting male thread 27c is provided with two longitudinal grooves extending the entire range from the upper end to the lower end at angle intervals of 180 degrees in the peripheral direction.

Moreover, the inside of the discharge port block forming the discharge port part 27 is created in such a way that the portion from the lowermost part to the vicinity of the lowermost end of the small cylindrical part 27b located in the upper part is formed in an upwardly-tapered shape whose diameter becomes smaller upwardly, and the inside of the small cylindrical part 27b located in the upper part is formed as a cylindrical inner surface having the same diameter to the upper end.

The lower part's upper layer block 21b, the lower lid 21c which is the lower layer of the lower part, and the discharge port block which is the discharge port part 27 are also made of transparent plastic material in the same manner as the cylindrical member 21a in example 2. Also in example 2, the capacity of 260-ml water can be contained in the space from the upper surface of the lower part's upper layer block 21b that forms the bottom surface of the vessel's main body 21 to the lower end of the discharge port block that forms the discharge port part 27. This is approximately 74% of the capacity of the vessel's main body 1 in example 1. Needless to say, the capacity is not intended to be limited to the above-mentioned capacity.

Figure 9:
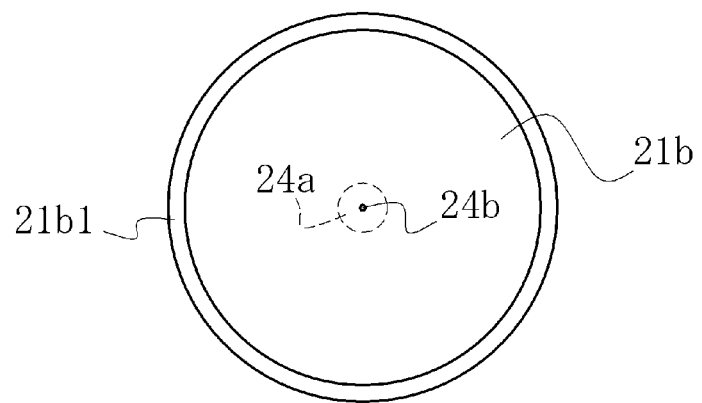
FIG. 9 is a plan view of the lower part's upper layer block of the portable hydrogen-water generating pot in example 2.

As shown in FIG. 6, FIG. 7, and FIG. 9, the gas passage 24 is a communicating passage created at the center of the lower part's upper layer block 21b so as to connect the inside of the vessel's main body 21 and the inside of the chemical tank 26. The gas passage 24, except for the uppermost part, as shown in FIG. 6 and FIG. 7, is created as a large-diameter communicating passage also serving as a valve arrangement part 24a, and a check valve 23 is inserted into the valve arrangement part 24a. A female thread which screws onto the male thread created on the periphery of the cylindrical base 23a of the check valve 23 is created on the lower side periphery of the valve arrangement part 24a, and the check valve 23 inserted into the valve arrangement part 24a is then fixed at that position by screwing together the external thread on the outer periphery of the cylindrical base 23a and the internal thread. The uppermost part of the gas passage 24 has a small-diameter gas passing small hole 24b which is created at a location that corresponds to the central part of the valve arrangement part 24a, and opens to the upper surface of the lower part's upper layer block 21b.

As shown in FIG. 6 and FIG. 7, the check valve 23 comprises a cylindrical base 23a fixed to the lower part of the valve arrangement part 24a and an elastic valve 23b extending from the upper end of the base upwardly in a conical shape, and is a valve member constructed in such a way that if gas pressure over a certain level of pressure is applied from below, the tip of the elastic valve 23b opens allowing the gas to pass upward, and if water pressure is applied from above due to water etc. contained in the vessel's main body 1, the check valve would not open.

Figure 10:
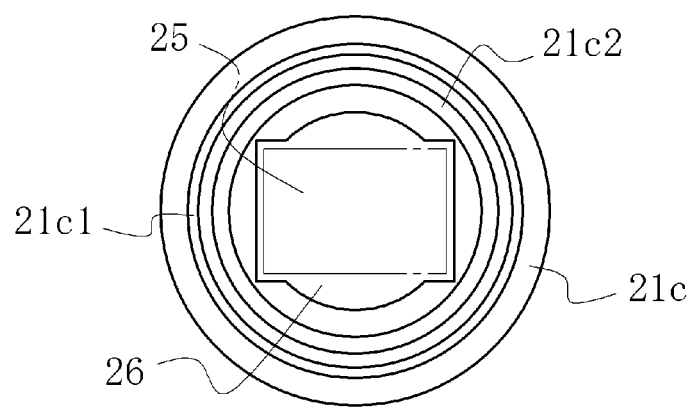
FIG. 10 is a plan view of the lower lid of the portable hydrogen-water generating pot in example 2.

As stated above and shown in FIG. 6, FIG. 7 and FIG. 10, the chemical tank 26 is basically a square concave portion in planar view formed at the central part of the inner surface of the lower lid 21c in such a way that two parallel sides facing each other extend outwardly. The length of four sides excluding the extended portions corresponds to the size of the hydrogen-generating agent 25 contained therein, and the chemical tank 26 is created slightly larger than that size. Regarding the depth, the chemical tank 26 is created using a depth larger than both the thickness of the hydrogen-generating agent 25 and the thickness of the filter 24f bonded and fixed to the bottom surface of the lower part's upper layer block 21b to prevent a foreign object from entering the gas passage 24. Furthermore, as shown in FIG. 6, FIG. 7 and FIG. 10, an annular groove 21c2 for inserting an o-ring is created on the upper surface of the periphery of the chemical tank 26 of the lower lid 21c.

As shown in FIG. 6 to FIG. 8, the lid 29 is basically a cylindrical member, and on the inner periphery, a connecting female thread 29a is created which screws onto the connecting male thread 27c located on the outer periphery of the small cylindrical part 27b of the upper part block forming the discharge port part 27. Furthermore, on the lower side outer periphery of the lid 29, a skirt part 29b is formed which covers directly on the portion having the same diameter as that of the cylindrical member 21a of the upper part block forming the discharge port part 27 with the connecting female thread 29a of the lid 29 screwed onto the connecting male thread 27c of the small cylindrical part 27b. Moreover, as shown in FIG. 6 and FIG. 7, on the portion of the lid 29 that faces the upper end of the small cylindrical part 27b, an annular groove 29c for inserting an o-ring is created; thereby allowing airtightness in the vessel's main body 21 to be maintained while an o-ring is inserted into the annular groove and the lid 29 is attached to the discharge port part 27.

For the hydrogen-generating agent 25, any hydrogen-generating agent 25 which reacts with water to generate hydrogen gas can freely be adopted. A type of hydrogen-generating agent 25 which reacts quickly in a short amount of time is preferable. In example 2, the same hydrogen-generating agent as that of example 1, which includes fine powder aluminum, calcium oxide and magnesium as ingredients, was adopted.

Therefore, according to the portable hydrogen-water generating pot in example 2, when producing hydrogen water, the chemical tank 26 is first filled with the hydrogen-generating agent 25, and water or a liquid, such as water or coffee, that has water as its major ingredient and is to be made into hydrogen water, is injected into the vessel's main body 21. Furthermore, the hydrogen-generating agent 25 does not favorably react with sugar-containing water and seldom generates hydrogen. Therefore, the liquid to be contained in the vessel's main body 21 is limited to the liquid which has water as a major ingredient and does not contain sugar if a part of the liquid is extracted and injected into the chemical tank 26 and reacted with the hydrogen-generating agent 25; however, if the liquid in the vessel's main body 21 is not used in that way, any raw water can be freely selected as far as the liquid has water as a major ingredient. In example 2, mineral water was contained in the vessel's main body 1. Also in example 2, a small plastic vessel (capacity of 1.2 cc) was prepared, and the small vessel was filled with a weakly-acidic water solution serving as water for generating hydrogen to be added to the hydrogen-generating agent 25, and the small vessel was attached to the hydrogen-generating agent 25. As a weak acid, citric acid was used in example 2. The reason for using an acid, as just described, is to neutralize water that becomes basic when the water reacts with the hydrogen-generating agent 25.

The lower lid 21c located in the lower part of the vessel's main body 21 is removed, and the hydrogen-generating agent 25 is charged into the chemical tank 26 located on the upper surface of the lower lid, and the lower lid 21c is then attached to the bottom of the lower part's upper layer block 21b located in the lower part of the vessel's main body 21. This is done by sequentially unscrewing and screwing the connecting female thread part 21c1 of the lower lid 1c from and onto the connecting male thread part 21b2 in the lower part's upper layer block 21b. Furthermore, needless to say, the lid 29 is removed from the discharge port part 27 of the vessel's main body 21, and the mineral water is injected from the exposed upper end opening of the small cylindrical part 27b of the discharge port block that forms the discharge port part 27. After that, the lid 29 is externally attached to the discharge port part 27 in the same manner. By screwing the connecting female thread 29a of the lid 29 onto the connecting male thread 27c located on the outer periphery of the small cylindrical part 27b, the lid 29 is fixed in the above-mentioned externally-covering state. Thus, the upper end of the small cylindrical part 27b tightly presses the o-ring that is engaged with the annular groove 29c located on the bottom surface of the lid 29, and therefore, after that, the inside of the vessel's main body 1 is kept airtight.

Hydrogen water can be produced anytime after the above procedures; however, it is appropriate to produce hydrogen water at the time when drinking of it is desired.

When producing hydrogen water, water needs to be added to the hydrogen-generating agent 25 in the chemical tank 26, and as stated above, a liquid contained in the vessel's main body 21 or other water can be used. In example 2, instead of using a liquid in vessel's main body 21, a citric acid water solution contained in the small vessel attached to the hydrogen-generating agent is used.

It is impossible for the hydrogen-generating agent 25 used in example 2 to favorably react with sugar-containing water and generate hydrogen; however, since the citric acid water solution contained in the small vessel does not contain sugar, such a problem will not occur. The citric acid water solution can be effectively used to generate hydrogen.

Therefore, in example 2, when producing hydrogen water, the lower lid 21c is removed, approximately 1.2 cc of citric acid water solution contained in the small vessel is injected into the chemical tank 26 located on the inner surface of the lower lid 21c, and the lower lid 21c is immediately attached to the lower part's upper layer block 21b located in the lower part of the vessel's main body 21. This is an example in which a hydrogen-generating agent 25 has been beforehand charged in the chemical tank 26, and later a citric acid water solution is injected into the hydrogen-generating agent 25. However, another procedure can be adopted in which only raw water is contained in the vessel's main body 1, at the time when a hydrogen water is desired for drinking, the lower lid 21c is removed and a hydrogen-generating agent 25 is charged into the chemical tank 26 located on the inner surface of the lower lid, a citric acid water solution is also almost simultaneously injected into it from the small vessel, and immediately after that, the lower lid 21c is attached to the lower part's upper layer block 21b located in the lower part of the vessel's main body 21.

Thus, by charging a hydrogen-generating agent 25 and a citric acid water solution contained in the small vessel into the chemical tank 26 in that sequential order and almost simultaneously, the hydrogen-generating agent 25 contained therein quickly reacts with water in the citric acid water solution, generating a hydrogen gas. The hydrogen gas generated therein is to pervade the chemical tank 26 and the space under the check valve 23 of the gas passage 24, and when gas pressure therein finally exceeds a certain level of pressure due to the continuous generation of hydrogen gas, the hydrogen gas moves to the upper side of the gas passage 24 through the check valve 23, gradually dissolves into the mineral water in the vessel's main body 21 to which the gas passage 24 is connected, and residual hydrogen gas is to be ejected in the form of small bubbles and move upward.

Since the cylindrical member 21a and other parts that configure the vessel's main body 21 are made of transparent plastic material, the situation can be seen from outside and the hydrogen generating state can be observed.

Herein, a filter 24f bonded and fixed to the bottom surface of the lower part's upper layer block 21b is interposed between the chemical tank 26 and the gas passage 24, and hydrogen gas moves, as stated above, through the filter 24f. Therefore, if package of powder etc. of the hydrogen-generating agent 25 in the chemical tank 26 is broken or so and the content comes out from the package, there is no possibility that the content will enter into the vessel's main body 21.

With regard to the generation of hydrogen gas, on the level of hydrogen generation possible in a portable device, as stated in example 1, reaction with water can progress much quicker than by means of the electrolysis of water, and a large amount of hydrogen gas can be quickly generated. In example 2, as stated above, when approximately 1.2 cc of citric acid water solution is injected into the chemical tank 26 almost simultaneously with the hydrogen-generating agent 25 or after the hydrogen-generating agent 25 has been charged into the chemical tank 26, a sufficient amount of hydrogen gas can be generated when approximately 3 minutes have elapsed from the point of time the water solution was injected.

Hydrogen gas thus generated moves to the vessel's main body 21 through the check valve 24 as stated above, moves upward in the form of bubbles while dissolving into the mineral water, and residual undissolved hydrogen gas moves to a space above the upper surface of the mineral water contained in the vessel's main body 21. Although the pressure of hydrogen gas etc. in that space gradually increases, a large number of experimental results verify that the inside atmospheric pressure does not exceed 2 atmospheres or less. The vessel's main body 21 can withstand nearly 10 atmospheres, and therefore, there is no fear of the pressure increasing too high and rupturing the vessel's main body 21.

As stated above, after a certain period of time, that is, 3 minutes, when a sufficient amount of hydrogen gas is considered to have been generated after the citric acid water solution contained in the small vessel was injected, has elapsed, by shaking the vessel's main body 21 for 20 to 30 seconds to mix the mineral water and hydrogen gas contained therein, it is possible to promote the dissolution of the hydrogen gas into the mineral water. Consequently, mineral water in the vessel's main body 21 becomes hydrogen water in which hydrogen is dissolved at sufficiently high concentration. As shown in example 1, for example, at a water temperature of 15° C. or higher, the concentration of hydrogen in the mineral water contained in the vessel's main body 21 is 0.9 to 1.1 ppm (ratio by weight) before the mixing operation by shaking the vessel's main body 21 and 1.3 to 1.6 ppm (ratio by weight) after the mixing operation. Although the concentration of hydrogen in the mineral water is sufficiently high before the mixing operation, it can be made higher by mixing operation.

After that, when serving hydrogen water contained in the vessel's main body 21 for drinking, the lid 29 which is externally attached to the discharge port part 27 to close the upper end opening of the small cylindrical part 27b is gradually loosened. By loosening the engaging state of the connecting female thread 29a of the lid 29 and the connecting male thread 27c of the small cylindrical part 27b, the airtightness created by tightly pressing the o-ring engaged into the annular groove 29c formed on the bottom surface of the lid 29 onto the upper end of the small cylindrical part 27b is released, and hydrogen gas of 2 atmospheres or lower remaining in the upper part of the vessel's main body 21 gradually flows out to the outside air through the longitudinal grooves created on the connecting male thread 27c. Once atmospheric pressure above the upper surface of the mineral water decreases, hydrogen in the mineral water is ejected in the form of many small bubbles and moves upward; meanwhile, since the vessel's main body 21 is transparent, the upward movement of many small hydrogen gas bubbles can be seen from outside.

As stated above, by gradually loosening and removing the lid 29, it is possible to drink mineral water-based hydrogen water. After that, the hydrogen water can be drunk directly from the upper end opening of the small cylindrical part 27b which is a discharge port or injected into a glass for drinking.

According to the portable hydrogen-water generating pot in example 2, as explained in example 1, since hydrogen is not generated by means of electrolysis by disposing electrodes in the vessel's main body 21, other than the above-mentioned mineral water and tap water, it is possible to use the above-mentioned coffee, teas, juices or various isotonic drinks, etc. as raw water for generating hydrogen water.

INDUSTRIAL APPLICABILITY

Portable hydrogen-water generating pots according to the present invention can be used in the manufacturing domain of those products.

REFERENCE SIGNS LIST

1 Vessel's main body
1a Cylindrical member
1b Lower part's upper layer block
1b1 Connecting small-diameter portion
1b2 Connecting male thread part
1b3 Opening for operation
1c Lower lid
1c1 Connecting female thread part
1d Concave portion
2 Fixed-quantity water supply means
2a Water supply channel
2a1 Small-diameter feed port
2a2 Valve seat arrangement part
2a3 Large-diameter insertion hole
2a31 Female thread part
2b Spherical body
2bh Fixed-quantity notch part
2c Knob
2d1 Upper valve seat
2d2 Lower valve seat
2e Lower part retainer member
2e1 Valve seat arrangement part
2e2 Through-hole
2e3 Male thread
3 Check valve
3a Cylindrical base
3b Elastic valve
4 Gas passage
4a Valve arrangement part
4b Divider plate
4bh Gas passing small hole
5 Hydrogen-generating agent
6 Chemical tank
7 Discharge port part
7a Connecting small-diameter portion
7b Small cylindrical part
7c Connecting male thread
8 Pressure reducing valve
8a Mounting hole
8b Leak hole
8c Mounting tube
8c1 Valve hole
8d Valve ball
8e Compressing spring
9 Lid
9a Connecting female thread
9b skirt part
9h Annular groove
10 Filter retainer
10a Filter storage part
10b, 10c Annular groove
10h Communicating hole
11 Filter
21 Vessel's main body 21a Cylindrical member
21b Lower part's upper layer block
21b1 Connecting small-diameter portion
21b2 Connecting male thread part
21c Lower lid
21c1 Connecting female thread part
21c2 Annular groove for inserting an o-ring
23 Check valve
23a Cylindrical base
23b Elastic valve
24 Gas passage
24a Valve arrangement part
24b Gas passing small hole
24f Filter
25 Hydrogen-generating agent
26 Chemical tank
27 Discharge port
27a Connecting small-diameter portion
27b Small cylindrical part
27c Connecting male thread
29 Lid
29a Connecting female thread
29b Skirt part
29c Annular groove for inserting an o-ring

The invention claimed is:

1. A portable hydrogen-water generating pot comprising:
a vessel's main body easily seen through and containing water or a liquid having water as its major ingredient;
a gas passage equipped with a check valve, arranged in an upper layer of a lower part of the vessel's main body, to feed hydrogen gas generated in a chemical tank located in a lower layer of a lower part to water or a liquid having water as its major ingredient contained in the vessel's main body to dissolve the hydrogen gas;
the chemical tank formed in the lower layer of the lower part of the vessel's main body to contain a hydrogen-generating agent that reacts with water to generate hydrogen;
a discharge port part created in an upper part of the vessel's main body; and
a lid detachably and externally attached to the discharge port part and capable of reducing pressure in the vessel's main body before the lid is removed from the discharge port part.

2. A portable hydrogen-water generating pot comprising:
a vessel's main body easily seen through and containing water or a liquid having water as its major ingredient;
a fixed-quantity water supply means for supplying a certain fixed-quantity of the water or liquid having water as its major ingredient contained in the vessel's main body to a chemical tank located in the lower layer of the lower part, and a gas passage equipped with a check valve to feed hydrogen gas generated in the chemical tank to water or the liquid having water as its major ingredient contained in the vessel's main body to dissolve the hydrogen gas, wherein both the fixed-quantity water supply means and the gas passage are formed in the upper layer of the lower part of the vessel's main body;
the chemical tank formed in the lower layer of the lower part of the vessel's main body to contain a hydrogen-generating agent that reacts with water to generate hydrogen;
a discharge port part created in the upper part of the vessel's main body; and
a lid detachably and externally attached to the discharge port part, equipped with a pressure reducing valve to maintain pressure in the vessel's main body so that the pressure does not exceed a certain level, and capable of further reducing pressure in the vessel's main body before the lid is removed from the discharge port part.

3. The portable hydrogen-water generating pot according to claim 2, wherein
the fixed-quantity water supply means comprises
a water supply channel arranged in the upper layer of the lower part of the vessel's main body and connecting the inside of the vessel's main body to the inside of the chemical tank located in the lower layer of the lower part;
a spherical body, disposed in the middle of the water supply channel, and provided with a fixed-quantity notch part which opens toward the inside of the vessel's main body in a normal state, opens toward the inside of the chemical tank by being turned when necessary, and is capable of containing a certain fixed-quantity of water or liquid having water as its major ingredient; and
an operation means for turning the spherical body.

4. The portable hydrogen-water generating pot according to claim 1, wherein
the chemical tank is created on an inner surface of a lower lid which is the lower layer of the lower part that detachably screws to the upper layer of the lower part of the vessel's main body.

5. A portable hydrogen-water generating pot comprising
a vessel's main body provided with an inner space containing water or a liquid having water as its major ingredient, an upper lid, a lower lid, and a hydrogen-generating agent which reacts with water to generate hydrogen, wherein generated hydrogen is dissolved in the water or liquid having water as its major ingredient;
the portable hydrogen-water generating pot comprising
the upper lid detachably attached to an upper part of the vessel's main body,
the lower lid detachably attached to a lower part of the vessel's main body,
the hydrogen-generating agent which reacts with water contained in a chemical tank body and generates hydrogen, and
a check valve for allowing generated hydrogen to enter into the inner space and preventing water or a liquid having water as its major ingredient contained in the inner space from flowing back toward the hydrogen-generating agent; wherein
a hole to connect to the inner space is created in a lower part of the vessel's main body, the lower end is open, and a check-valve arranged gas passage in which the check valve is disposed is formed,
the chemical tank is provided with a chemical tank space for containing the hydrogen-generating agent, and the chemical tank space is connected to the check-valve arranged gas passage, and
the hydrogen-generating agent is contained in the chemical tank space, and when water is added, hydrogen generated in the chemical tank outside the vessel's main body is supplied via the check valve disposed in the vessel's main body to water or a liquid having water as its major ingredient contained in the inner space of the vessel's main body from below the inner space.

6. The portable hydrogen-water generating pot according to claim 5, wherein
the chemical tank space of the chemical tank body is connected to the check-valve arranged gas passage via a filter.

7. The portable hydrogen-water generating pot according to claim 5, wherein
the vessel's main body is equipped with a circular outer shape block body forming a bottom part of the vessel's main body, and the block body is provided with a check-valve arranged gas passage in which the check valve is disposed.

8. The portable hydrogen-water generating pot according to claim 5, wherein
the chemical tank body is formed by a circular outer shape block body, and a screw thread created on an inner surface of the block body is threadably mounted to the screw thread created on an outer surface of the circular outer shape block body forming a bottom part of the vessel's main body, and the chemical tank body is attached to the vessel's main body.

9. The portable hydrogen-water generating pot according to claim 5, wherein
the lid is provided with a pressure reducing valve for reducing a pressure in the inner space of the vessel's main body.

10. The portable hydrogen-water generating pot according to claim 5, wherein
the hydrogen-generating agent is made of a mixture of aluminum and calcium oxide and packaged in a bag.

11. The portable hydrogen-water generating pot according to claim 10, wherein
the hydrogen-generating agent further includes magnesium.

12. The portable hydrogen-water generating pot according to claim 5, wherein
the chemical tank is formed inside the lower lid.

* * * * *